July 6, 1937. J. R. REYBURN 2,086,512
TIRE CHAIN
Original Filed Aug. 20, 1935
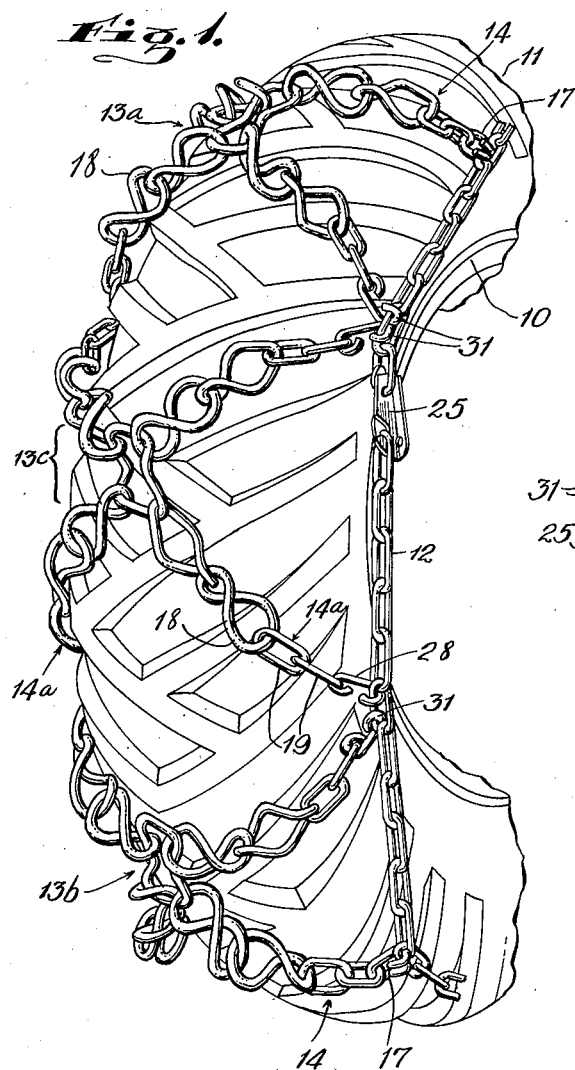
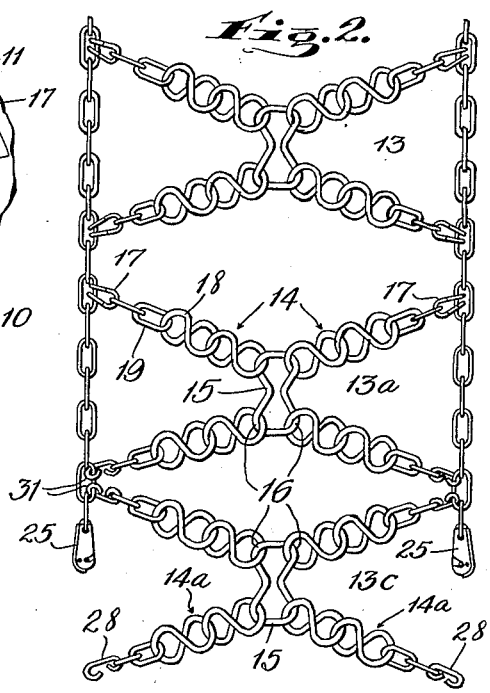
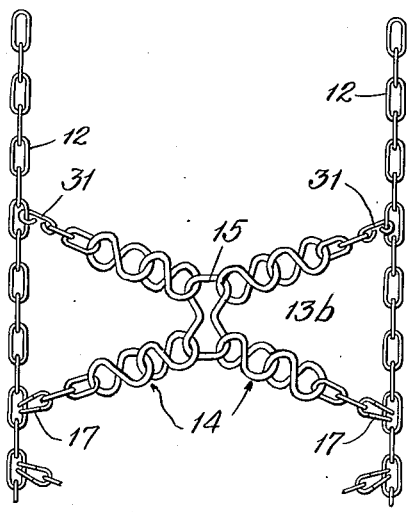
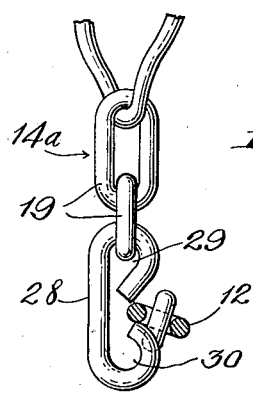
INVENTOR
JOHN R. REYBURN
BY
ATTORNEY Patented July 6, 1937

2,086,512

UNITED STATES PATENT OFFICE 2,086,512

TIRE CHAIN

John R. Reyburn, Fairfield, Conn., assignor to American Chain and Cable Company, Inc., a corporation of New York Original application August 20, 1935, Serial No. 36,943, now Patent No. 2,053,047. Divided and this application July 21, 1936, Serial No. 91,663

3 Claims. (Cl. 152—14)

The present application is a division of my co-pending application Serial No. 36,943, filed August 20, 1935, now Patent No. 2,053,047, and relates to improvements in tire chains of the type comprising a pair of side chains connected by cross chains disposed in cruciform sets.

Since such tire chains must be adjustable to take up wear of the tire and of the chain as well, there is apt to be a greater gap between the cross chains along the tread of the tire in the region where the side chains are joined than at other parts of the wheel, and an object of the present invention is to provide special means for closing this gap.

A more specific object of the invention is to provide what I term a "floating" cross chain set to bridge said gap, the floating set being permanently secured to the side chains near the joint and being provided at the free ends thereof with connectors for attachment to the side chains at any convenient point on the opposite side of the joint.

Other objects and advantages of my invention will appear in the following description of a preferred embodiment, and thereafter the novelty and scope of the invention will be set forth in the claims.

In the accompanying drawing;

Figure 1 is a fragmental view in perspective of a portion of an automobile wheel with my improved tire chain attached thereto, illustrating particularly the floating cross chain set employed in the region where the side chains are coupled together;

Fig. 2 is a fragmental plan view of the tire chain shown in Fig. 1 with the side chains and the floating cross chains disconnected; and Fig. 3 is a detail view of a hook which may be employed to attach the free ends of the floating cross chain set to the side chains.

A portion of the rim 10 of an automobile wheel and a pneumatic tire 11 thereon is shown in Fig. 1. On the tire is mounted a tire chain assembly, which, as best shown in Fig. 2, comprises a pair of side chains 12 connected by cruciform cross chain sets 13, 13a, 13b, etc. Each of these sections consists of four (4) chain members 14 arranged like the legs of a letter X and radiating from a central link 15. This central link may be of any suitable kind but preferably is of hour-glass form, as shown in the drawing. This form is preferred because it provides four lobe portions 16, each of which is engaged by a chain leg 14. The lobe portions serve to separate the legs 14 and provide a greater spread between the cross-chain legs at their common connecting point, thus distributing the tractive effort of the cross chain members more uniformly about the periphery of the tire. The outer ends of the cross chain members 14 are permanently secured by means of hooks 17 to the side chains 12.

In the particular embodiment illustrated, each cross chain leg comprises a pair of specially formed links 18 connected by flat loop links 19 to the hooks 17. The links 18, as fully described and claimed in the parent application of which the present application is a division, are constructed to stand out to a maximum extent from the tread surface of the tire, thereby providing a maximum grip on soft material, such as, mud, snow, and deep loose earth.

The ends of each side chain are connected together by means of fasteners 25 to form a closed ring. As shown clearly in Fig. 2, the forward legs 14 of the set 13 are connected to the side chains very near the rear legs (that is the upper legs, as viewed in Fig. 2) of the set 13a, there being actually only one intervening link. Similarly, the forward legs of the set 13a are connected to the side chains immediately adjacent the fasteners 25. However, the rear legs of set 13b cannot be connected to the extreme ends of the side chains but must be spaced therefrom so as to provide for the necessary take-up as the tire chain stretches or the tire becomes reduced in diameter due to wear or other reasons. Thus, there is apt to be a wide gap between the cross chain set 13a on one side of the fasteners 25 and the cross chain set 13b on the other side, and in order to fill up this gap I provide a floating cross chain set 13c which is similar in form to the other cross chain sets but has only two of its legs permanently attached to the side chains, the other two legs being provided with means 28 by which they may be attached to the side chains beyond the fasteners 25 after the side chains have been fastened together.

Obviously, various forms of detachable hooks may be employed on the outer ends of the links 14a of the floating set, but the particular hook I prefer to use is that shown at 28 in Fig. 3. This hook consists of a rod bent to form a substantially closed eye 29 at one end which is inter-linked with the end link 19 of the leg 14a. The other end of the hook is bent to form an open eye 30 adapted to hook into a link of the side chain 12, but the shape of the link is such that the cross chain must be twisted, as shown in Fig. 3, out of normal position before it can be inserted between the two eyes of the hook and be interlinked with the open eye 30. The link is prevented from unhooking accidentally by the overlying substantially closed eye portion 29 and by the fact that there is a narrow space between the eyes 29 and 30 through which the link may be withdrawn only when the plane of the hook 28 is substantially perpendicular to the plane of the side chain link.

Since the permanently attached ends of the floating cross chain set 13c and the adjacent ends of the fixed set 13a are preferably attached to the same side chain links, I prefer to use single closed hooks 31 at these points instead of the usual double hooks 17. Similarly, the adjacent legs of the cross-chain set 13b are also permanently attached to the side chains by single hooks 31 so that if necessary the hooks 28 may be interlinked with the same side chain links as are engaged by the hooks 31 of the section 13b.

In operation, the tire chain is placed upon the tire and the ends of each of the side chains are coupled together by means of the fasteners 25, in the usual manner. Thereafter, the free ends of the floating set are hooked to the links of the side chain, thus filling up the gap which normally occurs at the tread in the region where the side chains are coupled. Since the floating tire chain section is provided with detachable hooks 28 it may be drawn as tightly as desired and hooked to such links of the side chains as will give it the desired tension. In other words, as the slack is taken up due to stretch of the chain, or, for any other reason, the free ends of the floating set may be lapped over the adjacent ends of the set 13b and be hooked into the side chains beyond the points where the hooks 31 connect the members of set 13b to the side chains.

While my invention is applicable for general use it will be found of particular advantage on farm tractors or other vehicles which move relatively slowly through mud or soft ground. With such vehicles it is more important to prevent any material gap in the gripping surface of the wheel than on a vehicle which travels at relatively high speed, because when a portion of the tire which is bare of gripping chains engages the soft surface, the wheel speeds up and gathers sufficient momentum to overcome the gripping action of the next cross chain set, and such slippage gradually increases until the entire wheel slides around without obtaining adequate hold on the surface. This difficulty is overcome by the use of my floating cross chain set.

Having thus described my invention what I claim as new and desire to protect by Letters Patent is as follows.

I claim:

1. A tire chain assembly comprising a pair of side chains, each side chain being formed with coupling means at one end thereof for detachably making fast to any of a series of links adjacent the other end of the chain whereby each side chain may be adjustably connected to form a closed loop of desired size, tread members connecting the side chains together including a cross chain adjacent said coupling means and another cross chain adjacent said series of links, a floating cross chain permanently attached at one end to one of the side chains adjacent the first-named cross chain, said floating cross chain being of sufficient length to bridge the coupling points of the side chains and extend to a point adjacent the second-named cross chain when the tire chain assembly is mounted on a tire, and means on the free end of the floating cross chain adapted to detachably hook fast to any of the links of the other side chain including the link to which said second-named cross chain is connected.

2. A tire chain assembly comprising a pair of side chains, each side chain being formed with coupling means at one end thereof for detachably making fast to any of a series of links adjacent the other end of the chain whereby each side chain may be adjustably connected to form a closed loop of desired size, tread members connecting the side chains together including a cross chain adjacent the coupling means and another cross chain adjacent said series of links, a four legged floating cross chain set with two legs thereof permanently attached to the side chains adjacent the first-named cross chain, said floating set being of sufficient length to bridge the coupling points of the side chains and extend to a point adjacent the second-named cross chain when the tire chain assembly is mounted on a tire, and a single eye hook at the free end of each of the other legs of the floating set adapted to be detachably hooked fast to any of the links of side chains including the links to which said second-named cross chain is connected.

3. A tire chain assembly comprising a pair of side chains, each side chain being formed with coupling means at one end thereof for detachably making fast to any of a series of links adjacent the other end of the chain whereby each side chain may be adjustably connected to form a closed loop of desired size, tread members connecting the side chains together including a cross chain adjacent said coupling means and another cross chain adjacent said series of links, a floating cross chain permanently attached at one end to one of the side chains adjacent the first-named cross chain, said floating cross chain being of sufficient length to bridge the coupling points of the side chains and extend to a point adjacent the second-named cross chain when the tire chain assembly is mounted on a tire, and means on the free end of the floating cross chain adapted to detachably hook fast to any of a plurality of links of the other side chain adjacent said second-named cross chain.

JOHN R. REYBURN.